(12) United States Patent
Donald et al.

(10) Patent No.: US 10,071,730 B2
(45) Date of Patent: Sep. 11, 2018

(54) VEHICLE PARKING CONTROL

(71) Applicant: GM GLOBAL TECHNOLOGY OPERATIONS LLC, Detroit, MI (US)

(72) Inventors: Paul A. Donald, Courtice (CA); Jarvis Chau, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 15/251,087

(22) Filed: Aug. 30, 2016

(65) Prior Publication Data

US 2018/0056989 A1  Mar. 1, 2018

(51) Int. Cl.
| | | |
|---|---|---|
| G01C 22/00 | (2006.01) |
| G05D 1/00 | (2006.01) |
| B60W 30/06 | (2006.01) |
| G05D 1/02 | (2006.01) |
| B60W 40/08 | (2012.01) |

(52) U.S. Cl.
CPC .......... B60W 30/06 (2013.01); G05D 1/0246 (2013.01); *B60W 2040/0809* (2013.01); *B60W 2420/42* (2013.01)

(58) Field of Classification Search
CPC ..... B60W 2040/0809; B60W 2420/42; B60W 30/06; G05D 1/0246
USPC ......................................................... 701/28
See application file for complete search history.

(56) References Cited

U.S. PATENT DOCUMENTS

| | | | |
|---|---|---|---|
| 2010/0235034 A1* | 9/2010 | Higgins | G05D 1/0083 701/28 |
| 2013/0106226 A1 | 5/2013 | Aoyama | |
| 2014/0058584 A1* | 2/2014 | Weng | G06F 7/00 701/1 |
| 2014/0121883 A1* | 5/2014 | Shen | B62D 15/0285 701/28 |
| 2017/0197636 A1* | 7/2017 | Beauvais | B60W 30/06 |

FOREIGN PATENT DOCUMENTS

| | | |
|---|---|---|
| DE | 102012016783 A1 | 3/2013 |
| DE | 102012009623 A1 | 11/2013 |
| DE | 102012212260 A1 | 1/2014 |
| DE | 102012017934 A1 | 3/2014 |
| DE | 102012022087 A1 | 5/2014 |
| DE | 102012216174 A1 | 5/2014 |
| DE | 102014116854 A1 | 5/2016 |

OTHER PUBLICATIONS

German Patent Office, Office Action issued in German Application No. 102017119435.5, dated Apr. 27, 2018.

* cited by examiner

*Primary Examiner* — Harry Y Oh
(74) *Attorney, Agent, or Firm* — Lorenz & Kopf, LLP

(57) ABSTRACT

Methods and Systems are provided for performing an automated parking operation of a vehicle. The methods and systems determine a position of a wireless driver device located outside of the vehicle. A vision system provides video data having a field of view selected based on the position of the wireless driver device. Gesture recognition processing is performed on the video data having the selected field of view. At least one gesture command is determined from the gesture recognition processing. An automated parking operation of the vehicle is performed using the at least one gesture command.

20 Claims, 3 Drawing Sheets

VEHICLE PARKING CONTROL

TECHNICAL FIELD

The present disclosure generally relates to vehicles, and more particularly relates to methods and systems for parking control using gesture recognition.

BACKGROUND

Parking a vehicle, such as between two other vehicles, can be a difficult task for a driver. Autonomous and semi-autonomous parking assistance systems exist which aid the driver in a parking maneuver. Such parking assistance systems detect and indicate obstacles located in front of or behind a vehicle during parking, using proximity sensors mounted at various locations on the vehicle. Some types of parking assistance systems include an imaging device such as a camera that is mounted to a front portion and/or a rear portion of the vehicle. The camera acquires image data that represents a viewable area either in front of or behind the vehicle and this is presented to the driver while within the vehicle. The parking assistance system may then provide feedback to the driver to indicate how to maneuver the vehicle into the parking space.

More recently, self-parking vehicles have become available that are able to autonomously execute a parking operation, albeit with the possibility for driver to supervise, e.g. contribute to control of, the parking operation of the vehicle, such as by halting the parking operation. In some instances, the self-parking operation can be supervised by a driver located outside of the vehicle. The driver may prefer to be outside the vehicle and adjacent the parking space for a better view of the maneuver. Such supervision from outside the vehicle has been performed by feedback to the parking assistance system from a smartphone or from a smart watch. The smartphone or smart watch require specialist equipment to be carried and used by the driver.

Accordingly, it is desirable to provide a method and system which allows supervision of a vehicle during a parking operation performed by a parking assistance system from outside of the vehicle. Further, the driver input to (i.e. supervision of) the parking assistance system should be enabled in an intuitive way that does not unnecessarily reduce system processing efficiency.

The present disclosure provides methods, systems and vehicles for achieving one or more of these desires in various embodiments and other related desires in various embodiments. Furthermore, other desirable features and characteristics of the present invention will become apparent from the subsequent detailed description of the invention and the appended claims, taken in conjunction with the accompanying drawings and this background of the invention.

SUMMARY

In one embodiment, there is provided a parking control system for a vehicle, comprising a position determination module configured to determine a position of a wireless driver device. A vision system control module is configured to provide video data having a field of view selected based on the position of the wireless driver device. A gesture determination module is configured to perform gesture recognition processing on the video data having the selected field of view and to determine at least one gesture command from the gesture recognition processing. A parking assistance module is configured to control a parking assistance system of the vehicle using the at least one gesture command.

In a further embodiment, there is provided a vehicle comprising a parking assistance system and a parking control system, the parking control system comprising: a position determination module configured to determine a position of a wireless driver device; a vision system control module configured to provide video data having a field of view selected based on the position of the wireless driver device; a gesture determination module configured to perform gesture recognition processing on the video data having the selected field of view and to determine at least one gesture command from the gesture recognition processing; and a parking assistance module configured to control the parking assistance system of the vehicle using the at least one gesture command.

In another embodiment, there is provided a method of performing an automated parking operation of a vehicle. The method comprises determining a position of a wireless driver device located outside of the vehicle. The method comprises providing, via a vision system, video data having a field of view selected based on the position of the wireless driver device. Gesture recognition processing is performed on the video data having the selected field of view. At least one gesture command is determined from the gesture recognition processing. An automated parking operation of the vehicle is performed using the at least one gesture command.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Although the FIGS shown herein depict an example with certain arrangements of elements, additional intervening elements, devices, features, or components may be present in actual embodiments. It should also be understood that FIG. 1 is merely illustrative and may not be drawn to scale.

Figure 1:
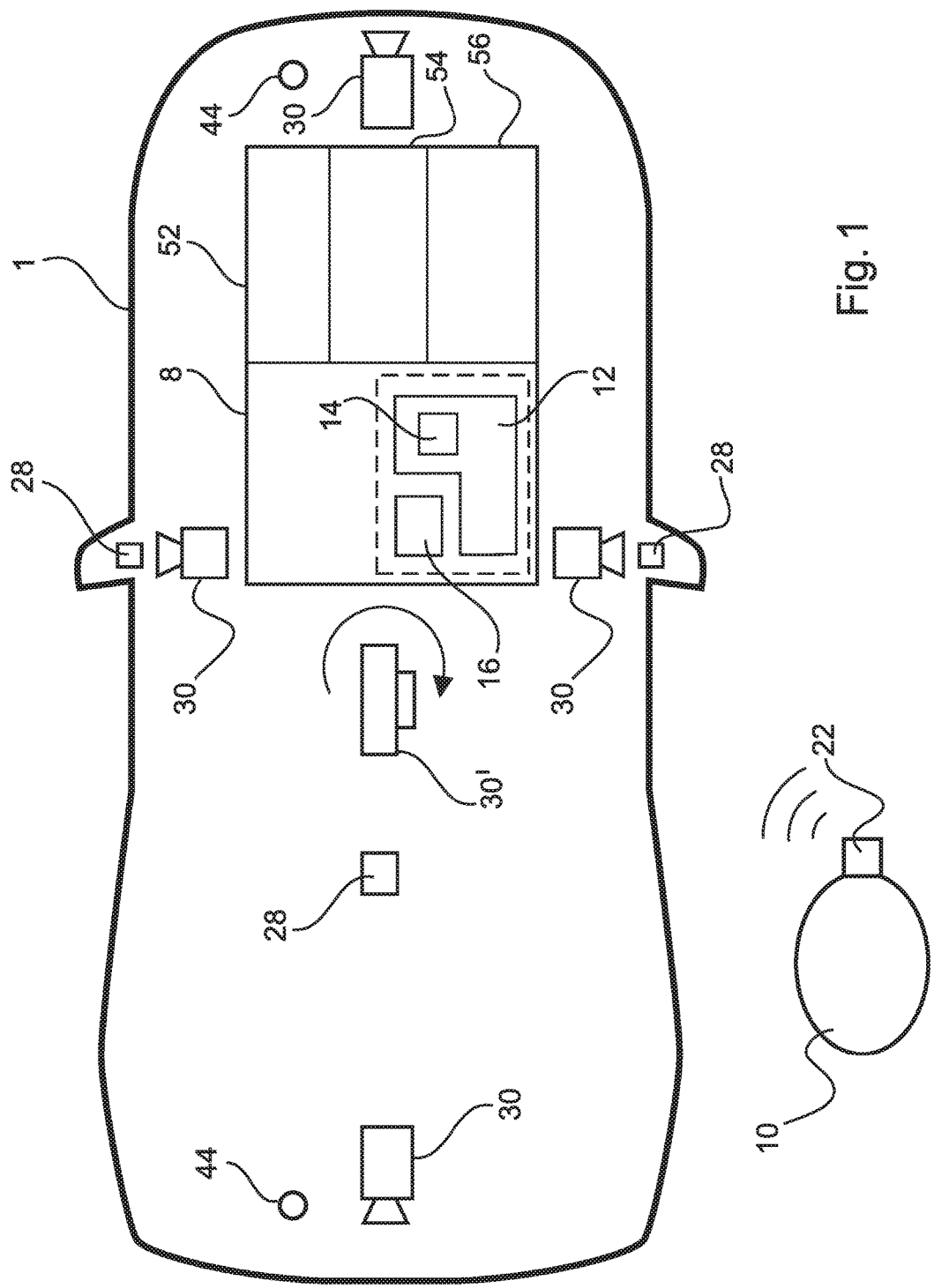
FIG. 1 is a functional block diagram of a vehicle that includes cameras of a vision system, wireless signal sensors and a vehicle control unit, in accordance with an exemplary embodiment.

FIG. 1 illustrates a vehicle 1, or automobile, according to an exemplary embodiment. The vehicle 1 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

Figure 2:
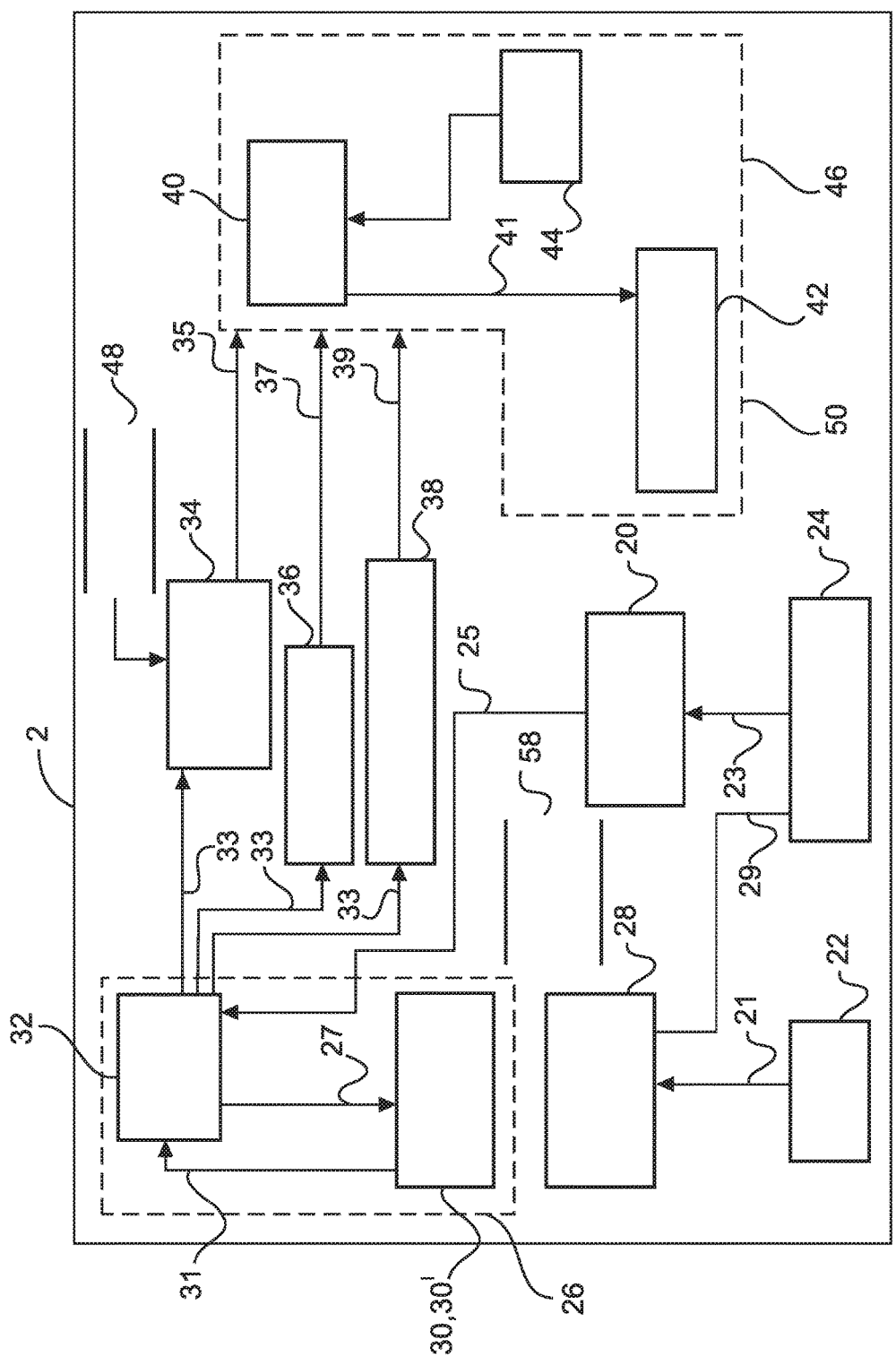
FIG. 2 is a data flow diagram including computer program modules as entities and hardware entities, in accordance with an exemplary embodiment.

The vehicle 1 includes a vehicle control unit 8 for controlling a parking control system 2 (shown in FIG. 2), for controlling automated movement of the vehicle 1 during a parking operation, for controlling a vision system 26 shown in FIG. 2 and for controlling gesture determination for driver supervision of the parking operation. It will be appreciated that the vehicle 1 is described herein with particular emphasis on the parking control system 2 executed by the vehicle control unit 8. The vehicle will have extensive further functionality including mechanical and electronic control systems that are not described herein in the interest of brevity.

The vehicle 1 comprises a vision system 26 (shown in FIG. 2) including one or more cameras 30. In various embodiments, the vehicle control unit 8 is configured to control the one or more cameras 30, 30' through modules to be described below with respect to FIG. 2 and to control analysis of video data captured by the one or more cameras 30, 30'.

In one embodiment, the vehicle 1 comprises a plurality of cameras 30, 30' operable to obtain video data with respect to various different locations associated with the vehicle 1. The cameras 30, 30' may be included within or proximate each of a rear view mirror, side mirrors, front grill, and rear region (e.g. trunk or rear door/hatch). In one embodiment, the cameras 30, 30' comprise video cameras controlled via the vehicle control unit 8. In various embodiments, the cameras 30, 30' may also be disposed in or proximate one or more other locations of the vehicle 1. For example, more or less than the shown five cameras 30, 30' could be included, such as six cameras 30, 30' for capturing video data of the vehicle's outside surroundings.

In embodiments, there is provided at least one rotatable camera 30', which may be mounted on the roof for example. The rotatable camera 30' is associated with a motor to allow rotation thereof to allow for a rotation of the field of view captured by the camera 30, such as 360° rotation. In an additional or alternative embodiment, at least one camera 30 is provided that are not necessarily rotatable (although may articulable as described in the following). The cameras 30 may be positioned to provide a surround view of the outside of the vehicle 1 such as a 360° surround view. Each camera 30, 30' may be able to be separately activated such that the full range of possible video data is not necessarily captured. The cameras 30, 30' may be able to image in the infrared region for improved imaging in dark conditions. The cameras 30, 30' may be capable of obtaining video data have three dimensions, e.g. having a depth component. Such video data may be obtained in known ways using spectroscopic cameras 30, 30' or time of flight light projection devices, as described further below.

In some embodiments, the one or more cameras 30, 30' may each be associated with an articulator for articulating the camera 30, 30' to change the field of view. The articulator may comprise a motor (not shown), a transmission and a pivot to allow the camera 30, 30' to change angle.

The vehicle 1 includes an array of parking sensors 44, e.g. proximity sensors 44, distributed around the vehicle 1. The parking sensors 44 are in communication with the vehicle control unit 8 to provide at least notification of an obstacle during an automated parking operation implemented by the parking assistance system 46 shown in FIG. 2. The parking sensors may be video devices, ultrasound, radar, infrared or any other known proximity sensor modality.

The vehicle 1 includes at least one wireless signal sensor 28, e.g. an array of at least three wireless signal sensors 28 spaced from each other. The wireless signal sensors 28 are configured for detecting wireless signals from a wireless driver device 22 located outside the vehicle during an automated parking operation. The wireless driver device 22 may be a smart phone, key fob, tablet, smart wearable or any other portable device able to generate the wireless signal. The wireless signal sensors 28 are configured to detect the wireless signal and properties thereof (such as signal strength) and communicate detected signals to the vehicle control unit 8.

The vehicle comprises various actuators for use in an automated parking operation. A steering wheel actuator 52 operates on a steering column of the vehicle in order to steer the vehicle 1 during the automated parking operation. A brake actuator 54 operates on vehicle brakes in order to control the speed and stop motion of the vehicle 1 during a parking operation. Further, engine and transmission controllers 56 are operate to transmit engine power to move the vehicle 1 at a selected speed and to control a direction (reverse or forward) of the vehicle movement during parking. Theses actuators and controllers 52, 54, 56 are responsive to commands from the vehicle control unit 8 for controlling the parking operation and particularly modules of the vehicle control unit 8 that are described in detail below.

In an embodiment, the vehicle control unit 8 comprises a computer system. In addition, it will be appreciated that the vehicle control unit may differ from the embodiment depicted in FIG. 1. For example, the vehicle control unit 8 may be coupled to or may otherwise utilize one or more remote computer systems.

The computer system of the vehicle control unit 8 includes a processor 16, a memory 12 and a bus (not shown). The processor 16 performs the computation and control functions of the vehicle control unit 8, and may comprise any type of processor or multiple processors, single integrated circuits such as a microprocessor, or any suitable number of integrated circuit devices and/or circuit boards working in cooperation to accomplish the functions of a processing unit. During operation, the processor 16 executes one or more programs 14 contained within the memory 12 and, as such, controls the general operation of the vehicle control unit 8 and the computer system of the vehicle control unit 8, generally in executing the processes described herein, such as the processes described with reference to FIG. 3 below. Further, the computer program 14 and the processor 16 are able to execute the computer implemented modules described below with respect to FIGS. 2 and 3.

The memory 12 can be any type of suitable memory. For example, the memory 12 may include various types of dynamic random access memory (DRAM) such as SDRAM, the various types of static RAM (SRAM), and the various types of non-volatile memory (PROM, EPROM, and flash). In certain examples, the memory 12 is located on and/or co-located on the same computer chip as the processor 16. In the depicted embodiment, the memory 12 stores the above-referenced program 14 and a database of predetermined gestures 48 and a database of biometric information 58.

The bus serves to transmit programs, data, status and other information or signals between the various components of the computer system of the vehicle control unit 8. The bus can be any suitable physical or logical means of connecting computer systems and components. This includes, but is not limited to, direct hard-wired connections, fiber optics, infrared and wireless bus technologies. During operation, the program 14 is stored in the memory 12 and executed by the processor 16.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 16) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the vehicle control unit 8 may also otherwise differ from the embodiment depicted in FIG. 1, for example in that the computer system of the vehicle control unit 8 may be coupled to or may otherwise utilize one or more remote computer systems and/or other systems.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various FIG.s contained herein are intended to represent example functional relationships and/or physical couplings between the various elements. It should be noted that many alternative or additional functional relationships or physical connections may be present in various embodiments.

According to various embodiments, the vehicle control unit 8 is configured to execute various modules (described further with reference to FIGS. 2 and 3) to locate a driver 10, to accordingly focus a field of view of at least one camera 30 on the driver 10 and to execute gesture recognition processing on video data capture by the camera in order to provide a gesture generated command, such as a halt command, to the parking control system 2 for automated parking of the vehicle 1. In this way, gesture recognition from video data of a driver 10 is used in order to supervise a parking operation of a vehicle 1. Hand and arm gestures may be utilized. Since the gestures are obtained from analyzing video data through the vehicle controller 8, supervision can be performed without specialist devices being required for controlling the parking operation. That is, device free gestures can be recognized. Further, the video data is restricted in field of view to the location of the driver by the vehicle control unit 8 locating the driver based on wireless signals sensed by the wireless signal sensor 28 of the vehicle 1 that have been transmitted from the wireless driver device 22 carried by the driver 10. In this way, the vehicle control unit 8 automatically hones in on the driver 10 and subsequently carried out gesture recognition processing to restrict the necessary processing. These features of the vehicle control unit 8 and the present disclosure are described further below with respect to the data flow diagram of FIG. 2 and the flow chart of FIG. 3.

The data flow diagram of FIG. 2 includes hardware entities, such as the wireless driver device 22, parking sensors 44, wireless signal sensors 28 and cameras 30, 30', as well as processor and software modules. FIG. 2 further shows the passage and transformation of data between the various entities.

Referring to FIG. 2, and with continued reference to FIG. 1, there is illustrated the wireless driver device 22, which is associated with (e.g. carried by) the driver 10 located outside of the vehicle 1. The wireless driver device 22 may be a key fob, a smartphone, a tablet, a wearable (e.g. watch, glasses, etc.) or any other device conveniently co-located with a driver 10 and able to generate wireless signals 21, as has been described above. The wireless signals 21 generated by the wireless driver device 22 may be a Bluetooth transmission, a Wi-Fi transmission, a LiFi transmission, a radiofrequency transmission, or any other known wireless transmission signal allowing position data to be determined, e.g. triangulated. The wireless signals 21 may be in the radiofrequency range of the electromagnetic spectrum, but visible signals can also be utilised that are pulsed at rates greater than those able to be seen by the human eye.

Further shown in FIG. 2, and also in FIG. 1, are the plurality of wireless signal sensors 28, which may encompass at least three wireless signal sensors 28. The wireless signal sensors 28 are located at spaced positions around the vehicle 1 for purposes of accurately determining a position of the driver device 22 by processing with the position determination module 20 described further below. The wireless signal sensors 28 output raw sensor signals 29 to the wireless signal sensor module 24.

The wireless sensor module 24 receives the raw sensor signals 29 and processes the raw sensor signals 29 into a format suitable for further processing, particularly by the position determination module 20. In particular, the wireless sensor module 24 may digitise the raw sensor signals 29 into the processed sensor data 23, which may further include data indicating signal strength with respect to each wireless signal sensor 28 for position determination purposes as described with respect to the position determination module 20.

FIG. 2 shows a position determination module 20 configured to determine a position of a wireless driver device 22 and to output driver device position data 25. The position determination module 20 receives processed sensor data 23 from a wireless signal sensor module 24 and, using the processed sensor data 23, determines a position of the wireless driver device 22 relative to the vehicle 1. The position determination module 20 may use a triangulation process to determine the position of the wireless driver device 22. In one exemplary implementation of the triangulation process, the sensor data 23 may include signal strength information from each of the wireless signal sensors 28, which can be triangulated to determine the position of the wireless driver device 22 according to a known triangulation scheme.

The position determination module 20 may determine an angular position of the driver device 22 relative to the vehicle 1 and optionally also a distance of the driver device 22 from the vehicle 1. The angular position and distance from the vehicle 1 may be determined relative to a fixed coordinate system centred in the vehicle 1. For example, an x, y coordinate system could be utilised with x being a lateral axis of the vehicle and y being a longitudinal axis of the vehicle, with an original of the coordinate system being at the centre of the vehicle 1. Alternatively, a polar coordinate system of r, θ could be utilised, with r representing radial distance from a central vertical axis passing through the vehicle 1 and θ representing an angle around the vehicle 1.

In FIG. 2, a vision system control module 32 is shown, which is configured to provide video data 33 having a field of view selected based on the position of the wireless driver device 22 as set by the driver device position data 25 received from the position determination module 20. In particular, a field of view of the video data 33 provided to the gesture determination module 34 is set, e.g. changed, so as to correspond to a location of the wireless driver device 22 based on the driver device position data 25. In one aspect, an angular position around the vehicle 1 of the field of view of the video data 33 provided to the gesture determination module 34 is set based on the driver device position data 25 so as to correspond to a location of the wireless driver device 22.

The vision system control module 32 is provided as part of the vision system 26 including at least one video camera 30 as described above. The at least one camera 30 is configured to capture video data 31, which is received by the vision system control module 32. In one embodiment, plural video cameras 30 are provided, optionally distributed around the vehicle 1, that are able to capture video data that at least partially surrounds the vehicle 1. The captured video data may fully surround the vehicle 1. In another alternative, a rotatable video camera 30' could be provided that allows video data to be captured at an angle around the vehicle 1 set by a rotational angle of the camera 30', as has previously been described. In another possibility, both types of cameras 30, 30' are provided.

The at least one video camera 30, 30' may provide depth video data or three dimensional video data in order to assist gesture recognition by the gesture determination module 34 described further below. For example, stereoscopic cameras 30, 30' could be utilised. The stereo video data is matched using a stereo matching algorithm. Alternatively, a time of flight video camera can be included to obtain depth video data. One example of a time of flight video camera projects a light (e.g. infrared) pattern and determines three-dimensional video data from the reflected light pattern. The time of flight video data can be registered with conventional video imaging by the at least one camera 30', 30 and the vision system control module 32.

The at least one camera 30, 30' is such as to be able to capture video data from a relatively large range of available fields of view. The vision system control module 32 is configured to limit the field of view of the video data provided to the gesture determination module 34 from the available fields of view based on the driver device position data 25. In this way, processing efficiency associated with the gesture determination module 34 can be increased as the video data being processed is limited in field of view.

The vision system control module 32 is able to limit the field of view of the video data in a number of possible ways based on the driver device position data 25, particularly driver device position data that includes an angular position around the vehicle 1. In one possibility, and with reference also to FIG. 1, the vision system control module 32 is able to determine a field of view selection command 27 that is received by the at least one video cameras 30, 30' to control a field of view of the video data 31 captured by the at least one camera 30,30' and received by the vision system control module 32. For example, the selection command 27 may include a camera angle command. The rotatable camera 30' is responsive to the camera angle command to rotate the camera 30' as directed to have a field of view including the wireless driver device 22 and the driver 10. In another example, the selection command 27 may activate a subset, e.g. one, of the plurality of cameras 30 having a field of view including the wireless driver device 22 and the video data is captured by the activated subset of the plurality of cameras 30. In another possibility, the video data 31 received by the vision system control module 32 is cropped to limit the field of view to the driver 10 and the wireless driver device 22 based on the driver device position data 25 from the position determination module 20.

In one embodiment, the vision system control module 32 is configured to select at least one of an angular position around the vehicle 1 of the field of view of the video data 33 and a size of the field of view including at least one of height and width dimensions provided to the gesture determination module 34 based on the driver device position data 25. The size of the field of view may be set based on a distance of the wireless driver device 22 from the vehicle included in the driver device position data 25. The closer the wireless driver device 22 is to the vehicle 1, and thus to the video cameras 30, 30', the larger the required size for the field of view. For example, predetermined height and width dimensions obtained from memory 12 for the field of view may be set based on the driver device position data 25. In one implementation, the selection command 27 may include a zoom or size of field of view setting based on a determined distance of the wireless driver device 22 from the vehicle 1. The at least one video camera 30, 30' is responsive to the selection command 27 to adjust a zoom or field of view setting based thereon. In another possible implementation, the vision system control module 32 may crop the video data 33 provided to the gesture determination module 34 to have a field of view sized in height and width and having an angle around the vehicle 1 set based on the driver device position data 25.

Continuing to refer to FIG. 2, the parking control system comprises the gesture determination module 34 configured to perform gesture recognition processing on the video data 33 to determine at least one gesture command 35 from the gesture recognition processing. Gesture recognition can be a processing intensive task. Doing so based on the pre-filtered video data 33 in terms of field of view allows for improved processing efficiency. Further, the pre-filtering process is carried out efficiently by locating the driver 10 using the wireless signal from the driver device 22. The gesture determination module 34 is configured to compare gestures from the video data 33 to known gestures from a database 48 in order to recognise a gesture. The recognised gesture can be correlated to a gesture command 35 based on an association between gesture information and gesture commands in the database 48.

Any known form of gesture recognition processing can be performed. One step could be to segment each frame of the video data to extract regions of interest such as the arms and hands. The segmented frames can then be tracked over time for movement. The movement of segmented images can form a gesture, which can be compared to known gestures from a database 48 of predetermined gestures obtained from the memory 12.

Examples of known gestures stored in the database 48 could include at least one of:

one or both hands of the driver 10 waving toward the body from the elbow, which can correspond to a command 35 for initiating a parking operation;

continuing waving of one or both hands of the driver 10 toward the body from the elbow, which can correspond to a command 35 for continuing the parking operation;

holding the palm of one or both hands out flat toward the vehicle 1, possibly in combination with the arm being held straight out in front of the body, which can correspond to a command 35 to pause the parking operation;

moving one or both hands to the right or left, which can correspond to a command 35 to shunt the vehicle 1 to the right or to the left.

FIG. 2 further illustrates a parking assistance system 50 that comprises parking sensors 44, a parking assistance module 40, a vehicle control module 42 and parking actuators 52, 54, 56 (shown in FIG. 1). The parking assistance module 40 is configured to automate a parking operation using known techniques. For example, the parking assistance module 40 may determine a parking space using video data from the cameras 30, 30', determine a vehicle path into the parking space and execute speed, direction (forward or reverse) and steering control through the parking actuators 52, 54, 56 in order to move the vehicle 1 along the determined vehicle path, thereby parking the vehicle 1 in the parking space. During the parking movement, the parking assistance module 40 takes into account feedback from parking sensors 44 as to any obstructions. For example, the parking sensors 44 may include radar, infrared, ultrasound, optical or other known proximity sensors. The parking assistance module 40 generates steering angle, direction of movement and speed and brake commands 41 that are sent to the vehicle control module 42. The vehicle control module 42 operates with the steering wheel actuator 52, the brake actuator 54 and the engine and transmission controllers 56 to implement the commands 41 from the parking assistance module 40.

The parking assistance module 40 is further configured to take into account gestures from a driver located outside of the vehicle 1, specifically to take into account the at least one gesture command 35 from the gesture determination module 34. For example, the gesture command 35 may instruct the parking assistance module 40 to perform at least one of: initiate a parking operation, continue the parking operation, pause the parking operation, cancel the parking operation, shunt the vehicle 1 left, and shunt the vehicle 1 right. The pause command may be implemented by the parking assistance module 40 generating a set of commands 41 for the vehicle control module 42 that operate to stop the vehicle 1 immediately.

The parking control system of FIG. 2 further comprises a driver attention check module 36 that is configured to receive the video data 33 having the limited field of view and to determine whether the driver 10 is facing away from the vehicle 1. In response to the driver 10 facing away from the vehicle, a pause command 37 can be sent to the parking assistance module 40 for pausing a parking operation. In order to determine that the driver's attention is on the vehicle 1, as it should be during a parking operation, similar gesture recognition processing can be performed on the video data 33 as described above for the gesture determination module 34. In particular, gesture recognition processing can be performed on the head of the driver 10 in the video data 33 in order to ascertain a direction in which the driver is facing. This could be performed by segmentation processing to determine certain facial features. A geometric relation between the facial features allows a facing direction of a driver's head to be determined. Should the driver 10 face away from the vehicle 1, a pause command 37 is issued to the parking assistance module.

The parking control system 2 of FIG. 2 further comprises a biometric authentication module 38 that is configured to authenticate the driver 10 from the video data 33 using biometric recognition processing. For example, facial recognition could be used for biometric authentication. The biometric authentication module 38 is configured to ascertain biometric information of a person in the video data 33 and to compare the biometric information with corresponding biometric information in a database of biometric information 58 of authorized drivers. Should there be a mismatch determined from the comparison, a stop command 39 is sent to the parking assistance module 40 to stop the parking operation.

The parking operations described herein include not only moving the vehicle 1 into a parking space, but also moving the vehicle 1 out of a parking space.

Figure 3:
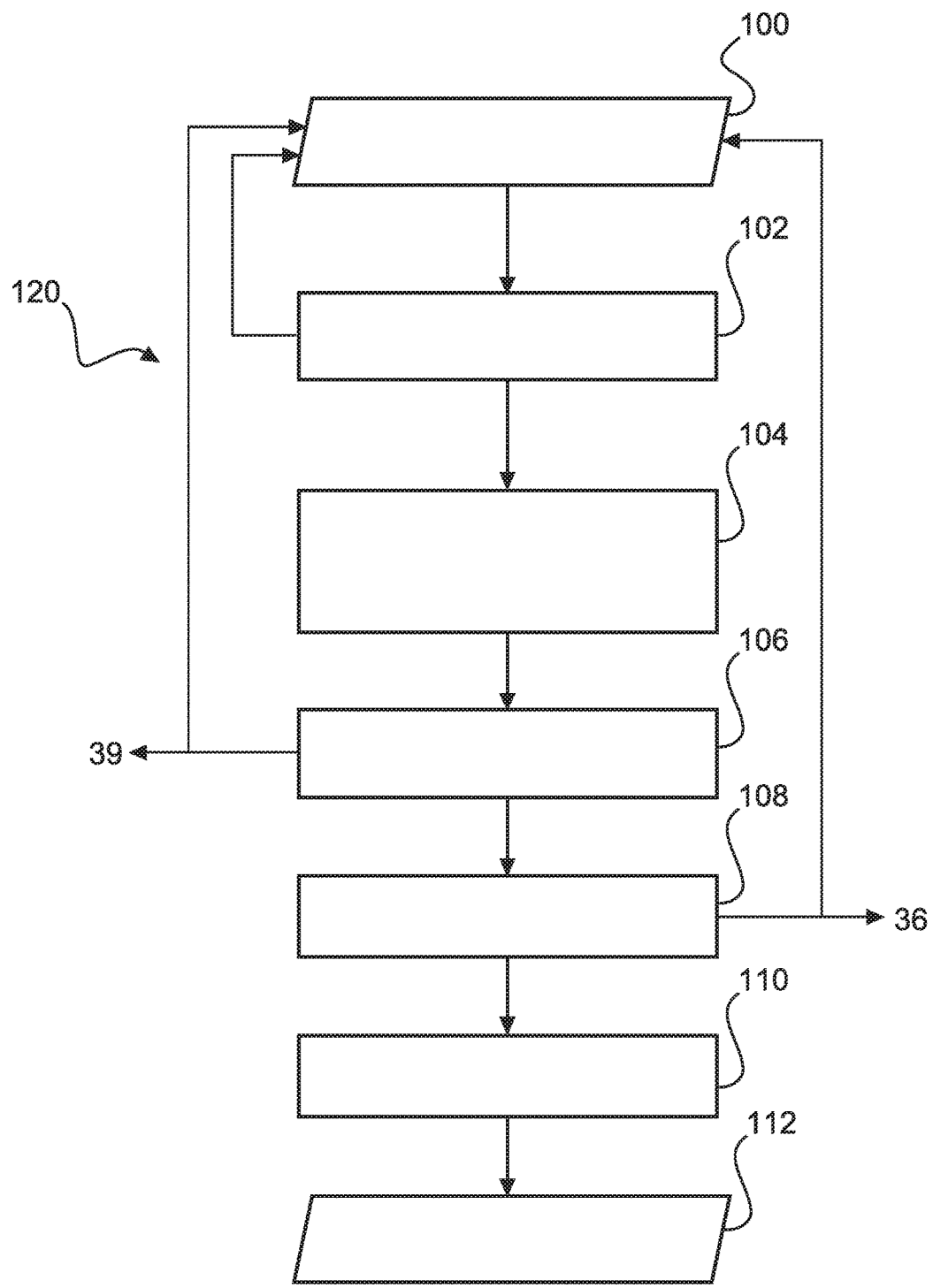
FIG. 3 is a flow chart including steps of a computer implement method, in accordance with an exemplary embodiment.

Reference is now made to the flow chart of FIG. 3, and with continued reference to FIGS. 1 and 2. The flow chart of FIG. 3 describes a computer implemented method 120 for performing a parking operation of a vehicle 1. The computer implemented method 120 is controlled by execution of at least one computer program 14 by the at least one processor 16 and through the associated modules of the parking control system 2 described with respect to FIG. 2.

The method 120 may be initiated upon activation of the automatic parking assistance system 46. The parking assistance system 46 may be activated by driver input from outside of the vehicle 1 or from inside the vehicle 1. For instance, activation may be performed through an instrument panel of the vehicle 1, through the wireless device 22 or through another device such as a button on the vehicle 1 (e.g. accessible from outside the vehicle 1), from a smart phone, a smart wearable, a tablet, a key fob, etc. Further, the vehicle control unit 8 detects when the driver is in range by listening for the wireless signal 21 (BLE, LiFi, etc. . . . ) that is broadcast from the driver device 22 (e.g. smart phone, wearable, etc. . . . ). Once the wireless signals 21 have been received and the automated parking operation has been activated, the method 120 can proceed.

At 100, wireless signals 21 are received by at least one wireless signal sensor 28 from a wireless driver device 22. In particular, the wireless signal 21 is received by an array of wireless signal sensors 28 (e.g. antennas) spaced from each other and included in the vehicle 1. The wireless driver device 22 is carried by a driver 10 located outside of the vehicle 1. The wireless driver device 22 may send the wireless signals periodically or in response to a driver input such as through a key fob button or a smart phone input interface (e.g. a touchscreen). Wireless signal triangulation assists the vision system 26 in focusing on the driver 10.

At 102, a position of the driver device 22 is determined using the position determination module 20. The position may be determined in at least two dimensional space in a coordinate system defined with respect to the vehicle 1. The position may be determined by a triangulation method using signal strength measures from each of at least three wireless signal sensors 28. The array of wireless sensors 28 (antennas) allows triangulation of the location of the driver 10 so that the at least one camera 30, 30' can focus on the driver in subsequent steps (perhaps to the exclusion of bystanders). Should the wireless signals be lost or triangulation is not possible, the method 120 returns to the initial step 100.

At 104, a vision system 26 is controlled to provide video data 33 of a limited field of view based on the position determined in step 102 by the vision system control module 32. In particular, driver device position data 25, which has been determined in step 102 by triangulation, is used to select a field of view of at least one camera 30 of the vehicle 1 from a range of possible fields of view. The selected field of view corresponds with the driver device position data 25 so as to include the wireless driver device 10 in the field of view. In this way, video data 33 that is focused on, or more restricted to, the subject (namely the driver 10) is used in subsequent processing steps including gesture determination. For example, the camera 30' is rotated so that its field of view corresponds to the location of the driver 22. Alternatively, the video data 33 is received from a selected one of a plurality of cameras 30 corresponding to the location of the driver 10. In a yet further alternative, 360° surround video data 31 is obtained from plural cameras 30 and the field of view is cropped in size and angular position according to the determined position of the driver 10 (which is assumed to correspond to the position of the wireless driver device 22).

At 106, the video data 33 is analyzed to biometrically authenticate the driver 10 by the biometric authentication module 38. Any biometric authentication process can be used, such as a facial recognition algorithm. This provides an additional security check that driver gestures are being carried out by an authorized driver. Should the biometric authentication of step 106 determine an unauthorized driver, a stop command 39 is sent to the parking assistance system 46 to the stop a parking operation and movement of the vehicle 1. Further, the method 120 returns to the initial step 100 in the event of a failure to biometrically authenticate the driver 10. By combining wireless signal triangulation and the biometric authentication, risk of a bystander taking control of the vehicle 1 by stepping in front of the driver 10 can be significantly reduced.

At 108, the video data 33 is analyzed to check for driver attention by the driver attention check module 36. In particular, a check is made that the driver 10 is facing towards the vision system 26, e.g. the at least one camera 30, 30' thereof. The video data 33 may be analyzed to determine a direction in which the driver 10 is facing by using recognition of facial features, perhaps through a segmentation algorithm, from which a direction of the face can be ascertained. Should the face be directed away from the vehicle 1, e.g. the vision system 26, then a pause command 37 is output to the parking assistance system 46 to pause a parking operation and stop movement of the vehicle 1. Further, the method 120 returns to the initial step 100. In this way, the vision system 26 can be used to detect which way the driver 10 is facing and to pause the parking operation if the driver 10 gets distracted and looks away from the vehicle 1.

One or both of steps 106, 108 may include a sub-step of determining whether a face of a driver 10 can be ascertained. If not, biometric authentication and/or driver attention check is assumed to have failed. Such a sub-step allows the parking operation to be halted when an obstacle is in the way of a driver's face or when a driver's face cannot be located for some other reason, such that the vision system is unable to perform the safety checks of steps 106, 108.

Assuming the driver attention and biometric authentication steps 108, 110 have been determined positively, the method 120 proceeds to step 110. At 110, a driver gesture is determined from the video data 33 by the gesture determination module 34. In particular, the video data 33 is analyzed to determine at least one driver gesture. The determined gesture is compared to a database 48 of predetermined gestures and correlated to a gesture command 35. That is, data from the vision system 26 (including cameras 30, 30', infrared cameras 30, 30', laser projection) is processed to monitor the driver 10 for movements so that the driver 10 is able to use intuitive gestures, such as waving the car forward or holding up their hand to stop, to remotely control the vehicle 1 during an automated parking operation. The gesture command 35 is output to the parking assistance system 46 and is used as an input for controlling a parking operation (e.g. in or out of a parking space) that is being automated by the parking assistance system 46. For example, the gesture command 35 may indicate pausing of the parking operation (and stopping movement of the vehicle 1), continuing of the parking operation, speed up, slow down, starting the parking operation, finishing the parking operation, shunt left, shunt right, etc.

At 112, the gesture command 35 is output to the parking assistance system 46 and is used as an input to control an automated parking operation. The parking operation is automated in the sense that vehicle motion is controlled automatically through the parking assistance module 40 and the vehicle control module to follow a determined parking trajectory. The parking trajectory may also be automatically determined by the parking assistance module 40. The parking operation is responsive, by the parking assistance module 40, to any gesture commands determined at step 110 and also to the parking sensors 44, particularly in case of an obstruction sensed by the parking sensors 44.

The method 120 is an iterative process performed throughout a parking operation, for example at least from parking start to parking end thereof. One or both of parking start and end points may be automatically determined by the vehicle control unit 8 through the parking assistance module 40 or determined by gesture recognition of the driver 10. In terms of iteration, the step 102 of determining a position of the wireless driver device 22 and responsively changing the field of view in step 104 based on the position of the driver device 22 can be iteratively performed during the parking operation. The driver 10 may move during the parking operation and the vision system 26 is able to adapt the field of view according to the movements of the driver based on position determination of the wireless driver device 22. Further, the driver attention check 108 may be iteratively performed during the parking operation to ensure continued driver attentions. Further, the step 110 of determining gestures can be iteratively performed during a parking operation to ensure that each new gesture of the driver 10 is appropriately determined and the associated command is generated and responded to by the parking assistance system 2. The iterative method 120 may be performed for each frame for each frame of video data from the at least one camera 30 or every predetermined number of frames.

By using wireless signal triangulation, the vision system 26 can focus on the driver 10 to interpret gestures for automated parking control, to perform facial recognition for evidence of remote supervision during a parking operation and to carry out biometric authentication.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

The invention claimed is:

1. A parking control system for a vehicle, comprising:
a position determination module configured to determine a position of a wireless driver device;
a vision system control module configured to provide video data having a field of view selected based on the position of the wireless driver device;
a gesture determination module configured to perform gesture recognition processing on the video data having the selected field of view and to determine at least one gesture command from the gesture recognition processing; and
a parking assistance module configured to control a parking assistance system of the vehicle using the at least one gesture command.

2. The parking control system of claim 1, wherein the position determination module is configured to determine an angular position of the wireless driver device relative to the vehicle.

3. The parking control system of claim 1, further comprising at least one wireless signal sensor for sensing wireless signals from the wireless driver device, wherein the position determination module is configured to determine the position of the wireless driver device based on sensed wireless data obtained from the at least one wireless signal sensor.

4. The parking control system of claim 1, wherein the position determination module is configured to determine the position of the wireless driver device by triangulating sensor data obtained from a plurality of wireless signal sensors, wherein the wireless signal sensors are configured to sense wireless signals from the wireless driver device.

5. The parking control system of claim 1, wherein the vision system control module is configured to select an angular position around the vehicle of the field of view of the video data provided to the gesture determination module based on the position of the wireless driver device.

6. The parking control system of claim 1, wherein the vision system control module is configured to select a size of the field of view including at least one of height and width dimensions provided to the gesture determination module based on the position of the wireless driver device.

7. The parking control system of claim 1, comprising a driver attention check module configured to receive the video data having the selected field of view and to determine from the video data whether a driver is facing away from the vehicle, wherein the driver attention check module is configured to provide a pause command to the parking assistance module in response to determining that the driver is facing away from the vehicle.

8. The parking control system of claim 1, comprising a biometric authentication module configured to biometrically authenticate a driver from the video data having the selected field of view using biometric recognition processing, wherein the biometric authentication module is configured to provide a stop command to the parking assistance module in the event of a failure in the biometric authentication.

9. A system, comprising the parking control system of claim 1, and at least one of the wireless driver device and a vision system including at least one camera for providing the video data and at least one wireless signal sensor for sensing wireless signals from the wireless driver device.

10. A vehicle comprising a parking assistance system and a parking control system, the parking control system comprising:
a position determination module configured to determine a position of a wireless driver device;
a vision system control module configured to provide video data having a field of view selected based on the position of the wireless driver device;
a gesture determination module configured to perform gesture recognition processing on the video data having the selected field of view and to determine at least one gesture command from the gesture recognition processing; and
a parking assistance module configured to control the parking assistance system of the vehicle using the at least one gesture command.

11. The vehicle of claim 10 comprising a vision system including at least one camera for providing the video data.

12. The vehicle of claim 10, comprising at least one wireless signal sensor configured to sense wireless signals from the wireless driver device.

13. A method of performing an automated parking operation of a vehicle, comprising:
determining a position of a wireless driver device located outside of the vehicle;
providing, via a vision system, video data having a field of view selected based on the position of the wireless driver device;
performing gesture recognition processing on the video data having the selected field of view;
determining at least one gesture command from the gesture recognition processing; and
performing the automated parking operation of the vehicle using the at least one gesture command.

14. The method of claim 13, wherein the determining step comprises determining an angular position of the wireless driver device relative to the vehicle.

15. The method of claim 13, further comprising sensing wireless signals from the wireless driver device using at least one wireless signal sensor of the vehicle, wherein the determining step comprises determining the position of the wireless driver device based on sensed wireless data obtained from the at least one wireless signal sensor.

16. The method of claim 13, wherein the determining step comprises determining the position of the wireless driver device by triangulating sensor data obtained from a plurality of wireless signal sensors, wherein the wireless signal sensors are configured to sense wireless signals from the wireless driver device.

17. The method of claim 13, comprising selecting, via the vision system, an angular position around the vehicle of the field of view of the video data based on the position of the wireless driver device, wherein gesture recognition processing is performed on the video data having the selected field of view having the selected angular position around the vehicle.

18. The method of claim 13, comprising selecting, via the vision system, a size of the field of view including at least one of height and width based on the position of the wireless driver device, wherein the gesture recognition processing is performed on the video data having the selected field of view having the selected size.

19. The method of claim 13, further comprising receiving the video data having the selected field of view, determining from the video data whether the driver is facing away from the vehicle, and pausing the automated parking operation and movement of the vehicle in response to determining that a driver is facing away from the vehicle.

20. The method of claim 13, further comprising biometrically authenticating a driver from the video data having the selected field of view using biometric recognition processing and stopping the automated parking operation and movement of the vehicle in the event of a failure in the biometric authentication.

* * * * *